United States Patent
Le et al.

(10) Patent No.: US 12,260,070 B2
(45) Date of Patent: Mar. 25, 2025

(54) SYSTEMS AND METHODS FOR GENERATING DYNAMIC INTERFACE OPTIONS USING MACHINE LEARNING MODELS

(71) Applicant: Capital One Services, LLC, McLean, VA (US)

(72) Inventors: Minh Le, McLean, VA (US); Arturo Hernandez Zeledon, McLean, VA (US); Rui Zhang, McLean, VA (US)

(73) Assignee: Capital One Services, LLC, McLean, VA (US)

(*) Notice: Subject to any disclaimer, the term of this patent is extended or adjusted under 35 U.S.C. 154(b) by 1185 days.

(21) Appl. No.: 17/029,861

(22) Filed: Sep. 23, 2020

(65) Prior Publication Data

US 2022/0091713 A1    Mar. 24, 2022

(51) Int. Cl.
| | | |
|---|---|---|
| G06F 3/0484 | (2022.01) |
| G06F 3/0481 | (2022.01) |
| G06F 9/451 | (2018.01) |
| G06F 40/205 | (2020.01) |
| G06F 40/279 | (2020.01) |
| G06N 3/045 | (2023.01) |
| G06N 3/08 | (2023.01) |
| G06V 10/40 | (2022.01) |
| G06V 30/10 | (2022.01) |

(52) U.S. Cl.
CPC .......... *G06F 3/0484* (2013.01); *G06F 3/0481* (2013.01); *G06F 9/451* (2018.02); *G06F 40/205* (2020.01); *G06F 40/279* (2020.01); *G06N 3/045* (2023.01); *G06N 3/08* (2013.01); *G06V 10/40* (2022.01); *G06V 30/10* (2022.01)

(58) Field of Classification Search
CPC ....... G06F 3/0481; G06F 9/451; G06N 3/045; G06N 3/08; G06N 3/044; G06N 3/088; G06N 5/01; G06N 20/20; G06V 10/40
See application file for complete search history.

(56) References Cited

U.S. PATENT DOCUMENTS

| | | | | |
|---|---|---|---|---|
| 2014/0278547 A1* | 9/2014 | Wickert | ................. | G16H 50/50 705/3 |
| 2019/0087691 A1* | 3/2019 | Jelveh | ................. | G06F 18/2178 |
| 2021/0065702 A1* | 3/2021 | Fink | ........................ | G06N 3/08 |
| 2021/0192140 A1* | 6/2021 | Galley | ..................... | H04L 51/42 |
| 2021/0232920 A1* | 7/2021 | Parangi | ............... | G06F 16/2457 |
| 2021/0248457 A1* | 8/2021 | Odibat | .................. | G06N 3/045 |
| 2021/0375280 A1* | 12/2021 | Wang | .................... | G10L 15/063 |

* cited by examiner

Primary Examiner — Phenuel S Salomon
(74) Attorney, Agent, or Firm — Foley & Lardner LLP (57) ABSTRACT

Methods and systems are described for generating dynamic interface options using machine learning models. The dynamic interface options may be generated in real time and reflect the likely goals and/or intents of a user. The machine learning model may provide these features by interpreting multi-modal feature inputs. For example, the machine learning model may include a first machine learning model, wherein the first machine learning model comprises a convolutional neural network, and a second machine learning model, wherein the second machine learning model performs a Weight of Evidence (WOE) analysis.

20 Claims, 5 Drawing Sheets

SYSTEMS AND METHODS FOR GENERATING DYNAMIC INTERFACE OPTIONS USING MACHINE LEARNING MODELS

FIELD OF THE INVENTION

The invention relates to generating dynamic interface options using machine learning models.

BACKGROUND

In recent years, the amount and uses of interactive programs has risen considerably. In tandem with this rise is the need to have human-like interactions and/or create applications that provide guidance and options for users. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic interface options. For example, dynamic interface options may facilitate an interactive exchange with users. The interactive exchange may include the system responding to one or more user actions (or inactions) and/or predicting responses prior to receiving a user action. In order to maintain the device interface session during the exchange, the system must generate responses that are both timely and pertinent (e.g., in a dynamic fashion). This requires the system to determine both quickly (i.e., in real-time or near real-time) and accurately the intent, goal, or motivation behind a user input. These user input or actions may take various forms include speech commands, textual inputs, responses to system queries, and/or other user actions (e.g., logging into a mobile application of the system). In each case, the system must aggregate information about the user action, information about the user, and/or other circumstances related to the user action (e.g., time of day, previous user actions, current account settings, etc.) in order to determine a likely intent of the user.

In order to determine the likely intent and generate a dynamic interface option that is both timely and pertinent, the methods and systems herein use one or more machine learning models. For example, the methods and system may use machine learning models in which multi-modal information about the user and/or information about user actions is used to generate feature inputs for machine learning models. These feature inputs are then input into machine learning models to generate dynamic interface options. For example, the feature inputs may include information about the user action, information about the user, and/or other circumstances related to the user action (e.g., time of day, previous user actions, current account settings, etc.). The feature inputs (e.g., vectors of data) may express the information quantitatively or qualitatively.

In particular, the system may generate feature inputs based on recent user interactions such as what feature or web pages a user recently visited. However, basing recommendations on this type (and/or only one time of information) is problematic. Most applications only have limited features (e.g., a help feature, a contact information feature, etc.) or web pages (e.g., a home page, user account page, etc.); therefore anticipating a user's intent based on his/her selection of features and/or web pages is difficult as users with multiple intents necessarily use the same features and/or web pages. To overcome this technical problem in computer systems, the system accesses and trains its machine learning models on multiple types of data (e.g., multi-modal data). For example, the system may generate a first feature input based on the metadata related to a user interface image, and the system may generate a second feature input based on time-dependent user account information. By using multi-modal feature inputs, and training separate machine learning models on each type, the system prevents bias from one feature input from affecting the other.

For example, the system may use a first machine learning model, wherein the first machine learning model comprises a convolutional neural network, to process a feature input based on the metadata related to a user interface image. The system may also use a second machine learning model, wherein the second machine learning model performs a classification on the time-dependent user account information. Additionally, the second machine learning model may perform a Weight of Evidence (WOE) analysis on the time-dependent user account information. For example, the system may perform a WOE analysis as a preprocessing step, the output of which is fed into a subsequent classification model. Notably, the use of the convolutional neural network for the first machine learning model may preserve a relationship of pixels in an image (e.g., in instance when user interface image data includes pixels), enabling better feature recognition, which is relevant to image processing and recognition. The use of the WOE analysis for the second machine learning model allows the system to detect outliers within the data and predict the outcome of events given varying degrees of knowledge of other variables.

In some aspects, the method or system may for generate dynamic interface options using machine learning models featuring multi-modal feature inputs. For example, the system may receive a first user action, from a first user, during a device interface session with a user interface. The system may determine a first user interface image corresponding to the first user action in the user interface. The system may determine metadata related to the first user interface image. The system may retrieve time-dependent user account information for the first user during the device interface session with the user interface. The system may generate a first feature input based on the metadata. The system may generate a second feature input based on the time-dependent user account information. The system may input the first feature input into a first machine learning model. The system may input the second feature input into a second machine learning model. The system may generate, at the user interface, a dynamic interface option selected by a machine learning model during the device interface session.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the image clearly dictates otherwise. In addition, as used in the specification and the claims, the term "or" means "and/or" unless the image clearly dictates otherwise. Additionally, as used in the specification "a portion," refers to a part of, or the entirety of (i.e., the entire portion), a given item (e.g., data) unless the image clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
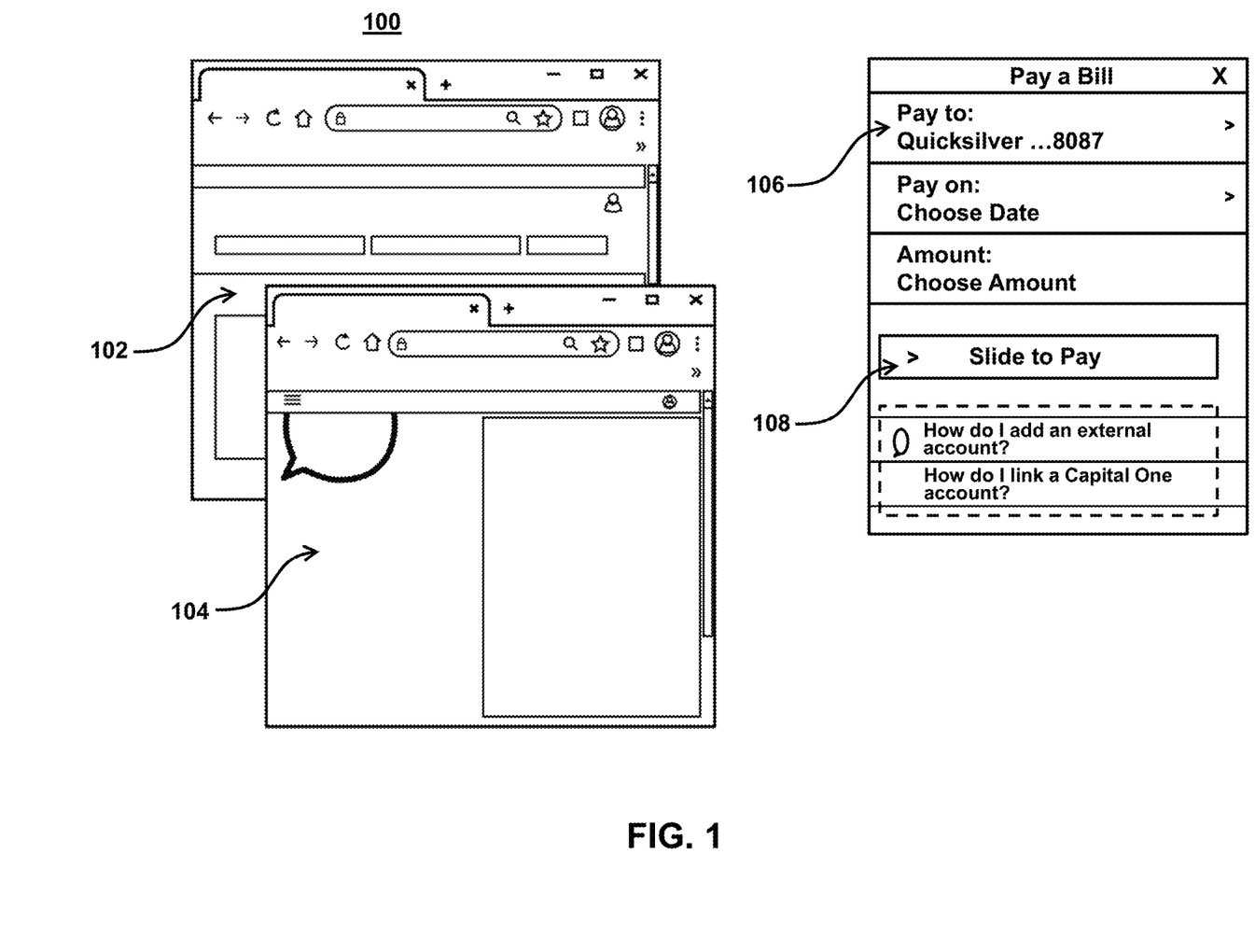
FIG. 1 shows an illustrative user interface for generating dynamic interface options using machine learning models featuring multi-modal feature inputs, in accordance with one or more embodiments.

FIG. 1 shows an illustrative user interface for generating dynamic interface options using machine learning models featuring multi-modal feature inputs, in accordance with one or more embodiments. For example, FIG. 1 shows user interfaces 102 and 104, which may be presented by an application or web pages. The system may monitor the interfaces interacted with the user to generate a first feature input. For example, the system may receive user interface image data, which may include data that describes an image currently or previously found in a user interface and/or characteristic, circumstances, and/or users related to the user interface. For example, the system may monitor, and user interface image data may include, user interactions in the user interfaces (e.g., user interfaces 102 and 104) during a device interface session with the user. The device interface session may include a back-and-forth exchange of ideas and information between the system and the user. The device interface session may proceed through one or more mediums (e.g., text, video, audio, etc.). For example, the system may generate data points such as demographic segments (age, gender, profession, household income), temporal aspects (time of day, season, events), geolocation, and other behavioral data during a device session into order to determine insights into the specifics of the context of usage of a particular digital product or service. For example, when a user engages with a device, the user may multitask between various applications and/or websites. The user may enter and exit device sessions and/or may perform user actions during these device sessions. Each of these engagements with the device may comprise a device session.

The system may receive a first user action (e.g., a user action interacting with user interfaces 102 and 104) from a first user, during a device interface session. The system may then retrieve time-dependent user account information for the first user during the device interface session with the one or more user interfaces. For example, time-dependent user account information may comprise user account information that changes and/or is based on time increments. For example, time-dependent user account information may comprise information on a frequency of an account update, information on an account status, and/or information on an account value.

For example, the system may comprise a model that predicts if a customer intends to make a credit card payment. To do so, the system may monitor a first type of data (e.g., user actions in interfaces 102 and 104) as well as a second type of data that includes time-dependent user account information (e.g., the due date of a credit card bill, current account balances, etc.). For example, the first type may include a set of text pages, reflecting the contents of the internet drive menu pages. The second type may include a set of numerical and categorical values. The system may then translate the first type of data into data arrays of numbers using natural language processing and processing this content using a convolutional neural network. The system may then process the second type of data using a model that performs a Weight of Evidence analysis.

For example, the system may determine optimal responses and/or dynamic user interface options based on user actions and the time-dependent information. For example, in order to maintain the device interface session, the system may need to generate response (e.g., interface option 108) dynamically and/or in substantially real-time in dynamic user interface 106. For example, the system may generate responses within the normal cadence of a conversation. In some embodiments, the system may continually determine a likely intent of the user in order to generate responses (e.g., in the form of prompts, notifications, and/or other communications) to the user.

For example, in response to a user action, which in some embodiments may comprise a user logging onto an application that generates user interface 100, inputting a query or other user action) into user interface 102, and/or a prior action (or lack thereof) by a user to a prior response generated by the system, the system may take one or more steps to generate a dynamic user interface 106 and dynamic user interface option 108. These steps may include retrieving data about the user, retrieving data from other sources, retrieving user actions, and/or other steps in order to generate a feature input (e.g., as discussed below).

In some embodiments, the feature input may include a vector that describes various information about a user, a user action, and/or a current or previous interaction with the user. The system may further select the information for inclusion in the feature input based on a predictive value. The information may be collected actively or passively by the system and compiled into a user profile.

In some embodiments, the first type of data (e.g., a user action) may include conversation details such as information about a current session, including a channel or platform, e.g. desktop web, iOS, mobile, a launch page (e.g., the webpage that the application was launched from), a time of launch, activities in a current or previous session before launching the application as described above in relation to the user interface image data. The system may store this information and all the data about a device interface session may be available in real-time via HTTP messages and/or through data streaming from more or more sources (e.g., via an API).

In some embodiments, the second type of data (e.g., a time-dependent information) may include user account information such as types of accounts the user has, other accounts on file such as bank accounts for payment, information associated with accounts such as credit limit, current balance, due date, recent payments, recent transactions. The system may obtain this data in real-time for model prediction through enterprise APIs.

In some embodiments, the types of information (e.g., user actions and/or time-dependent information) may include insights about users, provided to the application (e.g., via an API) from one or more sources such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

The system (e.g., a mobile application) may generate and respond to user interactions in the user interfaces (e.g., user interfaces 102 and 104) in order to engage in a device interface session with the user. The device interface session may include a back-and-forth exchange of ideas and information between the system and the user. The device interface session may proceed through one or more mediums (e.g., text, video, audio, etc.). The system may additionally use information about where in the user interface a user previously interacted in order to improve the device interface session by both customizing interface option to this information as well as generate interface options in images in the user interface based on this information.

User interface 102 includes a plurality of different images, each associated with different metadata, functions, and/or user actions. For example, user actions may be performed through direct manipulation of the graphical elements in user interface 102 such as selecting on an icon, entering textual information as a search field, etc. Moreover, in some embodiments, the system may receive user actions (or detect user inactions) by retrieving for, but not detecting, direct manipulations.

In such cases, the image in the user interface of the direct manipulation (or an area currently highlighted, and/or last interacted with) may be detected, and the system may generate the dynamic user interface option based on that image. For example, the system may determine a first user interface image corresponding to the first user action in the user interface. The system may then retrieve metadata related to the first user interface image.

The metadata may describe an image, function, feature, type of response, data used for the response, and/or other characteristic of the image. For example, the metadata may indicate that this image corresponds to a field in which a date is entered. The system may then modify the conversation response (or a feature input used to generate the interface option) based on this information. For example, the system may determine that, based on the field corresponding to a data, a dynamic interface option that is selected must also correspond to the data. In some embodiments, the system may also use other metadata. For example, the system may retrieve metadata that is unrelated to a current conversation response. Additionally or alternatively, the feature input may be based on metadata associated with any conversation response, user account, and/or activity image data that is related to a current user interface, in order to ensure the quality of the conversation responses. For example, the system may use metadata related to a location, time, event, device setting, etc. In some embodiments, the system may receive a first labeled feature input, wherein the first labeled feature input is labeled with a known dynamic interface option for the first labeled feature input and train the first machine learning model to classify the first labeled feature input with the known dynamic interface option based on contextual metadata related to the device interface session with the user interface.

For example, in user interface 102, the system may detect that the user action corresponds to an intent fulfilled by option 108. For example, in response to the user's actions, the system may generate dynamic user interface 106. The location, content, or method of determination of user interface 106 may be based on metadata associated with user interface 102. For example, in response to the metadata for user interface 102 indicating that the user wishes to pay a bill and/or other data (e.g., related to an upcoming pay date) indicating that the user wishes to pay the bill, the system may retrieve user account information prior to generating the feature input and/or interface option indicating a type of information (e.g., to be presented, to be used to determine the content, image, and method of determination for the interface option) and/or information related to a user or users (e.g., a pay date of the user). The system may then determine a feature input and/or interface option based on this information.

In some embodiments, the system may further determine an image of a conversation response on the user interface based on the image. For example, the system may select a second user interface image for generating the dynamic interface option based on the first user interface image. For example, in response to detecting that the user last interacted with a given window in the user interface, the system may generate for display, an interface option in the window. In such cases, the boundaries of the second user interface image may be located, wholly or in part, within boundaries of the first user interface image.

Figure 2:
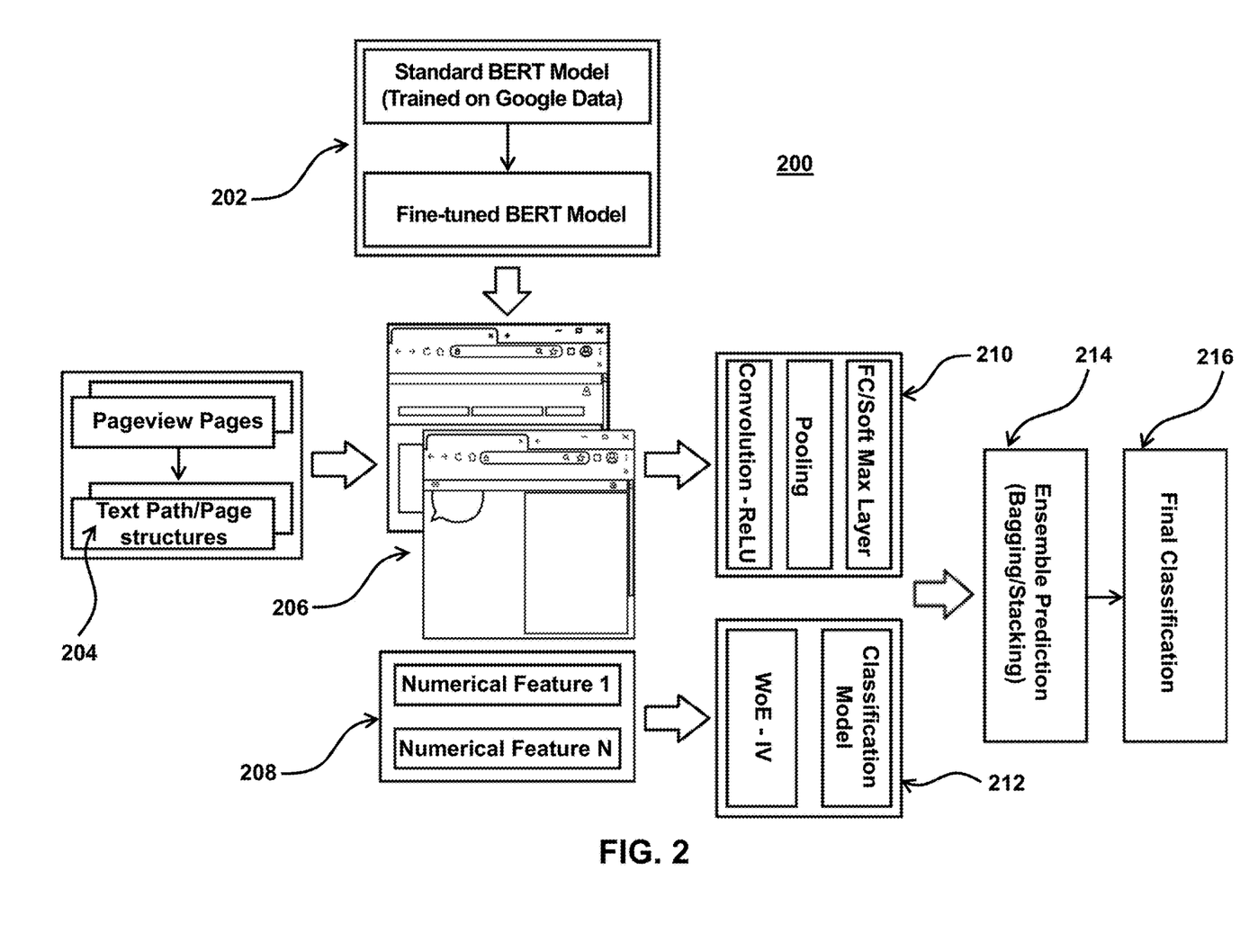
FIG. 2 shows an illustrative system architecture for generating dynamic interface options using machine learning models featuring multi-modal feature inputs in accordance with one or more embodiments.

FIG. 2 shows an illustrative system architecture for generating dynamic interface options using machine learning models featuring multi-modal feature inputs in accordance with one or more embodiments. System 200 may receive user action data based on user actions with user interfaces 206 during a device session. The user action data may include metadata 204, which may be metadata related to user interfaces 206. Metadata 204 may include pageview information and text path and page structure data. For example, a pageview (or pageview hit, page tracking hit) may be an instance of a page being loaded (or reloaded) in a browser. Text path information may indicate line, shapes, and/or graphic elements that text follows. Metadata 204 may also include information on how the application and/or the website is set up, i.e. how the individual subpages are linked to one another.

System 200 may also receive information 202, which may use a Bidirectional Encoder Representations from Transformers (BERT) language model for performing natural language processing. For example, the BERT model includes pre-training contextual representations including Semi-supervised Sequence Learning, Generative Pre-Training, ELMo, and ULMFit. Unlike previous models, BERT is a deeply bidirectional, unsupervised language representation, pre-trained using only a plain text corpus. Context-free models such as word2vec or GloVe generate a single word embedding representation for each word in the vocabulary, whereas BERT take into account the context for each occurrence of a given word. For instance, whereas the vector for "running" will have the same word2vec vector representation for both of its occurrences in the sentences "He is running a company" and "He is running a marathon", BERT will provide a contextualized embedding that will be different according to the sentence. Accordingly, the system is better able to determine an intent of the user.

System 200 may use transfer learning. For example, transfer learning allows system 200 to deal with current scenarios (e.g., detecting user intent) by leveraging the already existing labeled data of some related task or domain. System 200 may store knowledge gained through other tasks and apply it to the current task. For example, system 200 may use transfer learning to re-fine information 202 into fine-tuned BERT model information that is refined using internal data and/or data related to detecting user intent.

System 200 may then proceed to process this information in first model 210. First model 210 may include a convolutional neural network (CNN) that includes of an input layer and an output layer, as well as multiple hidden layers. The hidden layers of a CNN may include of a series of convolutional layers that convolve with a multiplication or other dot product. First model 210 may use an activation function in a RELU layer (and/or LeakyRELU layer), and may subsequently comprise additional convolutions such as pooling layers, fully connected layers and normalization layers, referred to as hidden layers because their inputs and outputs are masked by the activation function and final convolution.

First model 210 may also include a softmax function or a normalized exponential function. The softmax function takes as input a vector z of K real numbers, and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities.

System 200 may also receive numerical data 208 (e.g., time-dependent user account information). Numerical data 208 is input in second model 212. Second model 212 may perform a classification on the time-dependent user account information. Additionally or alternatively, the second machine learning model may use WOE and information value (IV) data. WoE describes the relationship between a predictor and a binary dependent variable. IV is the measurement of that relationship's power. Based on its role, IV can be used as a base for attributes selection. For example, WOE helps to transform a continuous independent variable into a set of groups or bins based on similarity of dependent variable distribution i.e. number of events and non-events. For continuous independent variables, second model 212 first creates bins (categories/groups) for a continuous independent variable and then combine categories with similar WOE values and replace categories with WOE values. For categorical independent variables, second model 212 combines categories with similar WOE and then create new categories of an independent variable with continuous WOE values. The system combines categories with similar WOE because the categories with similar WOE have almost same proportion of events and non-events. In other words, the behavior of both the categories is same.

System 200 includes first model 210 and second model 212. First model 210 and second model 212 may receive inputs and generate an output that is processed by third model 214. Third model 214 may then generate a final classification 216. Third model 214 may include ensemble prediction. For example, ensemble methods use multiple learning algorithms to obtain better predictive performance than could be obtained from any of the constituent learning algorithms alone. Unlike a statistical ensemble in statistical mechanics, which is usually infinite, a machine learning ensemble consists of only a concrete finite set of alternative models, but typically allows for much more flexible structure to exist among those alternatives. Additionally, the third model 214 may include bootstrap aggregating and stacking.

Bootstrap aggregating, often abbreviated as bagging, involves having each model in the ensemble vote with equal weight. In order to promote model variance, third model 214 trains each model in the ensemble using a randomly drawn subset of the training set. As an example, the random forest algorithm combines random decision trees with bagging to achieve very high classification accuracy. In bagging the samples are generated in such a way that the samples are different from each other however replacement is allowed. Stacking (sometimes called stacked generalization) involves training a learning algorithm to combine the predictions of several other learning algorithms. First, all of the other algorithms are trained using the available data, then a combiner algorithm is trained to make a final prediction using all the predictions of the other algorithms as additional inputs. If an arbitrary combiner algorithm is used, then stacking can theoretically represent any of the ensemble techniques described in this article, although, in practice, a logistic regression model is often used as the combiner. Stacking typically yields performance better than any single one of the trained models.

It should be noted that in some embodiments first model 210, second model 212, and third model 214 may be combined into or more models (e.g., may comprise a single model).

Figure 3:
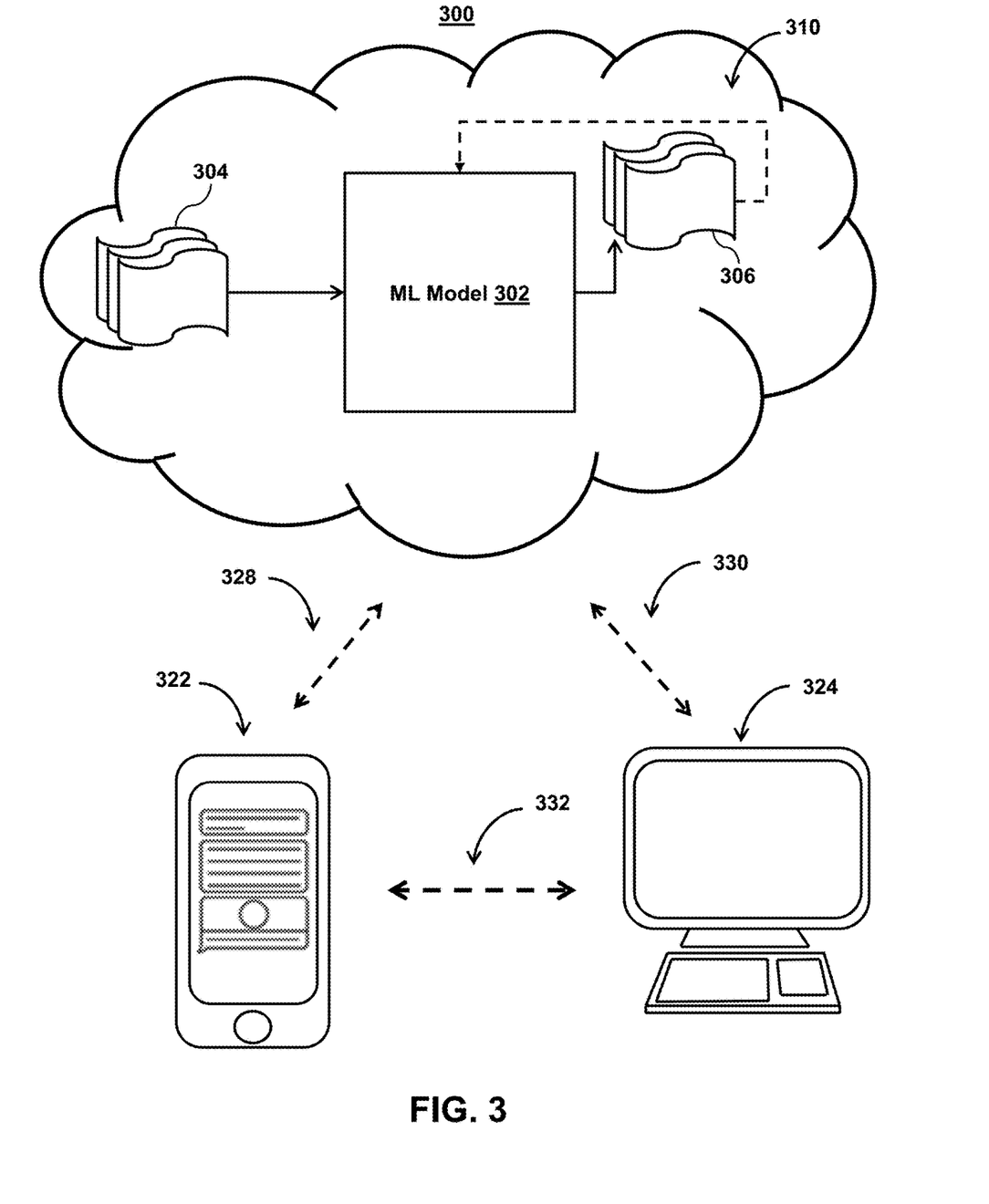
FIG. 3 is an illustrative system for generating dynamic interface options using machine learning models featuring multi-modal feature inputs, in accordance with one or more embodiments.

FIG. 3 is an illustrative system for generating dynamic interface options using machine learning models featuring multi-modal feature inputs, in accordance with one or more embodiments. For example, system 300 may represent the components used for generating dynamic interface options as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., based on recommended contact strategies).

Additionally, as mobile device 322 and user terminal 324 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic interface options using machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 4G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior transactions. Alternatively, or additionally, the system may act as a clearing house for multiple sources of information about the user. Cloud components 310 may also include control circuitry configured to perform the various operations needed to generate recommendations. For example, the cloud components 310 may include cloud-based storage circuitry configured to store a first machine learning model that is trained to select a dynamic interface option from a plurality of dynamic interface options based a first feature input. Cloud components 310 may also include cloud-based control circuitry configured to determine an intent of the user based on a machine learning model. Cloud components 310 may also include cloud-based input/output circuitry configured to generate the dynamic interface option during a device interface session.

Cloud components 310 includes machine learning model 302. Machine learning model 302 may take inputs 304 and provide outputs 306. The inputs may include multiple datasets such as a training dataset and a test dataset. Each of the plurality of datasets (e.g., inputs 304) may include data subsets related to user data, contact strategies, and results. In some embodiments, outputs 306 may be fed back to machine learning model 302 as input to train machine learning model 302 (e.g., alone or in conjunction with user indications of the accuracy of outputs 306, labels associated with the inputs, or with other reference feedback information). For example, the system may receive a first labeled feature input, wherein the first labeled feature input is labeled with a known dynamic interface option for the first labeled feature input. The system may then train the first machine learning model to classify the first labeled feature input with the known dynamic interface option.

In another embodiment, machine learning model 302 may update its configurations (e.g., weights, biases, or other parameters) based on the assessment of its prediction (e.g., outputs 306) and reference feedback information (e.g., user indication of accuracy, reference labels, or other information). In another embodiment, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

In some embodiments, machine learning model 302 may include an artificial neural network (e.g., as described in FIG. 3 below). In such embodiments, machine learning model 302 may include an input layer and one or more hidden layers. Each neural unit of machine learning model 302 may be connected with many other neural units of machine learning model 302. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Machine learning model 302 may be self-learning and trained, rather than explicitly programmed, and can perform significantly better in certain areas of problem solving, as compared to traditional computer programs. During training, an output layer of machine learning model 302 may correspond to a classification of machine learning model 302 and an input known to correspond to that classification may be input into an input layer of machine learning model 302 during training. During testing, an input without a known classification may be input into the input layer, and a determined classification may be output.

In some embodiments, machine learning model 302 may include multiple layers (e.g., where a signal path traverses from front layers to back layers). In some embodiments, back propagation techniques may be utilized by machine learning model 302 where forward stimulation is used to reset weights on the "front" neural units. In some embodiments, stimulation and inhibition for machine learning model 302 may be more free-flowing, with connections interacting in a more chaotic and complex fashion. During testing, an output layer of machine learning model 302 may indicate whether or not a given input corresponds to a classification of machine learning model 302.

In some embodiments, model 302 may predict a goal or intent of a user. This goal or intent may be selected from a plurality of goals and/or intents stored by the system. For example, the system may determine that users who ask different questions about payment have similar account information and digital activities. The system may further determine that the users tend to be different from those of users who have a one-off type request, such as lost card reports or travel notification. In some embodiments, the model (e.g., model 302) may automatically perform actions based on output 306. In some embodiments, the model (e.g., model 302) may not perform any actions on a user's account. The output of the model (e.g., model 302) is only used to decide which dynamic interface options to display to a user.

Figure 4:
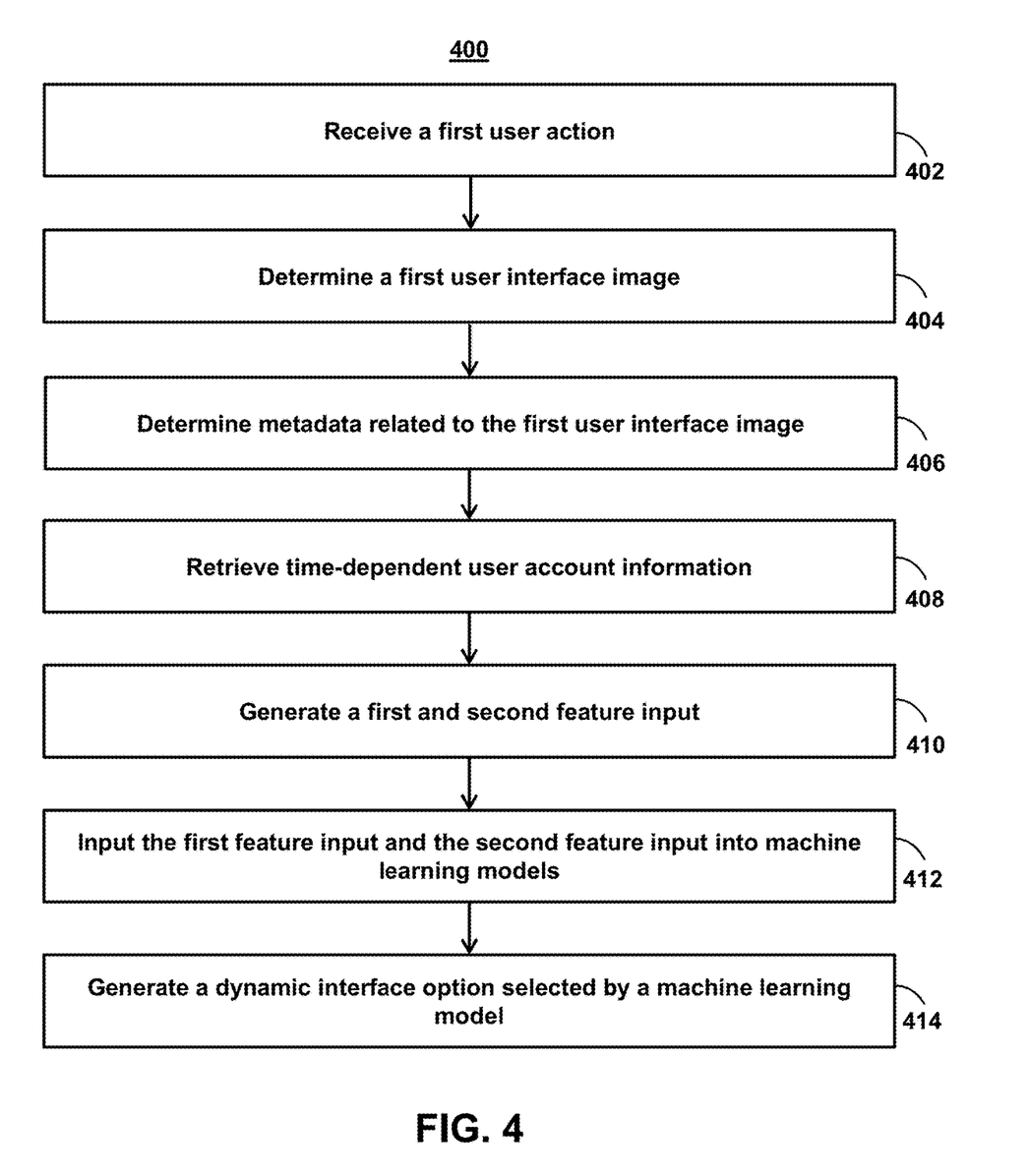
FIG. 4 shows a flowchart of the steps involved in generating dynamic interface options using machine learning models featuring multi-modal feature inputs, in accordance with one or more embodiments.

FIG. 4 shows a flowchart of the steps involved in generating dynamic interface options using machine learning models featuring multi-modal feature inputs, in accordance with one or more embodiments. For example, process 400 may represent the steps taken by one or more devices as shown in FIGS. 1-2 when generating dynamic interface options using two-tier machine learning models (e.g., as shown in FIG. 3).

At step 402, process 400 (e.g., using one or more components in system 300 (FIG. 3)) receives a first user action. For example, the system may receive, using control circuitry, a first user action, from a first user, during a device interface session with a user interface. For example, the system may receive a user action as described in FIGS. 1-2. For example, the user action may include accessing a menu, logging on to a application, etc.

At step 404, process 400 (e.g., using one or more components in system 300 (FIG. 3)) determines a first user interface image. For example, the system may determine a first user interface image corresponding to the first user action in the user interface. For example, the system may capture an image of a current user interface (and/or menus or features being accessed). The system may then apply computer vision techniques to determine metadata or a vector array corresponding to the image. For example, the system may employ computer vision tasks that include acquiring, processing, analyzing and understanding digital images, and extraction of high-dimensional data from the real world in order to produce numerical or symbolic information, e.g., in the forms of decisions. To understand the context of the image, the system may transform visual images into descriptions of data.

At step 406, process 400 (e.g., using one or more components in system 300 (FIG. 3)) determines metadata related to the first user interface image. For example, the system may determine metadata related to the first user interface image. In some embodiments, determining the metadata related to the first user interface image may comprise identifying text in the first image, parsing the text in the first image, and identifying keywords in the text. In some embodiments, determining the metadata related to the first user interface image may comprise generating a pixel array based on the first user interface image. For example, the system may generate a two-dimensional grid of pixels which define the form and color of a digital image.

At step 408, process 400 (e.g., using one or more components in system 300 (FIG. 3)) retrieves time-dependent user account information. For example, the system may retrieve time-dependent user account information for the first user during the device interface session with the user interface. In some embodiments, the time-dependent user account information may comprise information on a frequency of an account update, information on an account status, or information on an account value.

At step 410, process 400 (e.g., using one or more components in system 300 (FIG. 3)) generates a first and second feature input. For example, the system may generate a first feature input based on the metadata. The system may also generate a second feature input based on the time-dependent user account information. For example, through the use of separate feature inputs that may, alternatively be processed in parallel, the system reduces bias in one model attributed to the other.

At step 412, process 400 (e.g., using one or more components in system 300 (FIG. 3)) inputs the first feature input and the second feature input into machine learning models. For example, the system may input the first feature input into a first machine learning model. In some embodiments, the first machine learning model may comprise a convolutional neural network. The system may input the second feature input into a second machine learning model. In some embodiments, the second machine learning model may perform a Weight of Evidence (WOE) analysis. In some embodiments, the first machine learning model may use a Bidirectional Encoder BERT language model for performing natural language processing. For example, the BERT model includes pre-training contextual representations including Semi-supervised Sequence Learning, Generative Pre-Training, ELMo, and ULMFit. Unlike previous models, BERT is a deeply bidirectional, unsupervised language representation, pre-trained using only a plain text corpus. Context-free models such as word2vec or GloVe generate a single word embedding representation for each word in the vocabulary, whereas BERT take into account the context for each occurrence of a given word. For instance, whereas the vector for "running" will have the same word2vec vector representation for both of its occurrences in the sentences "He is running a company" and "He is running a marathon", BERT will provide a contextualized embedding that will be different according to the sentence. Accordingly, the system is better able to determine an intent of the user.

In some embodiments, the system may additionally or alternatively, use Embeddings from Language Models ("ELMo"). For example, ELMo is a deep contextualized word representation that models both (1) complex characteristics of word use (e.g., syntax and semantics), and (2) how these uses vary across linguistic contexts (i.e., to model polysemy). These word vectors may be learned functions of the internal states of a deep bidirectional language model (biLM), which may be pre-trained on a large text corpus. ELMOs may be easily added to existing models and significantly improve the state of the art across a broad range of challenging natural language processing problems, including question answering, textual entailment, and sentiment analysis.

In some embodiments, the system may additionally or alternatively, use Universal Language Model Fine-tuning ("ULMFiT"). ULMFiT is a transfer learning technique for use in natural language processing problems, including question answering, textual entailment, and sentiment analysis. ULMFiT may use a Long short-term memory ("LSTM") is an artificial recurrent neural network ("RNN") architecture. The LSTM may include a three layer architecture that includes: general domain language model pre-training; target task language model fine-tuning; and target task classifier fine-tuning.

At step 414, process 400 (e.g., using one or more components in system 300 (FIG. 3)) generates a dynamic interface option selected by a machine learning model. For example, the system may generate, at the user interface, a dynamic interface option selected by a machine learning model during the device interface session. In some embodiments, the dynamic interface option may comprise an option for a modification of an account of the first user.

In some embodiments, the system may also receive information about previous device session and/or interfaces interacted with. For example, the system may determine a second user interface image corresponding to a second user action in the user interface during a previous device interface session, determine additional metadata related to the second user interface image, and update the first feature input based on the additional metadata.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one of more of the steps in FIG. 4.

Figure 5:
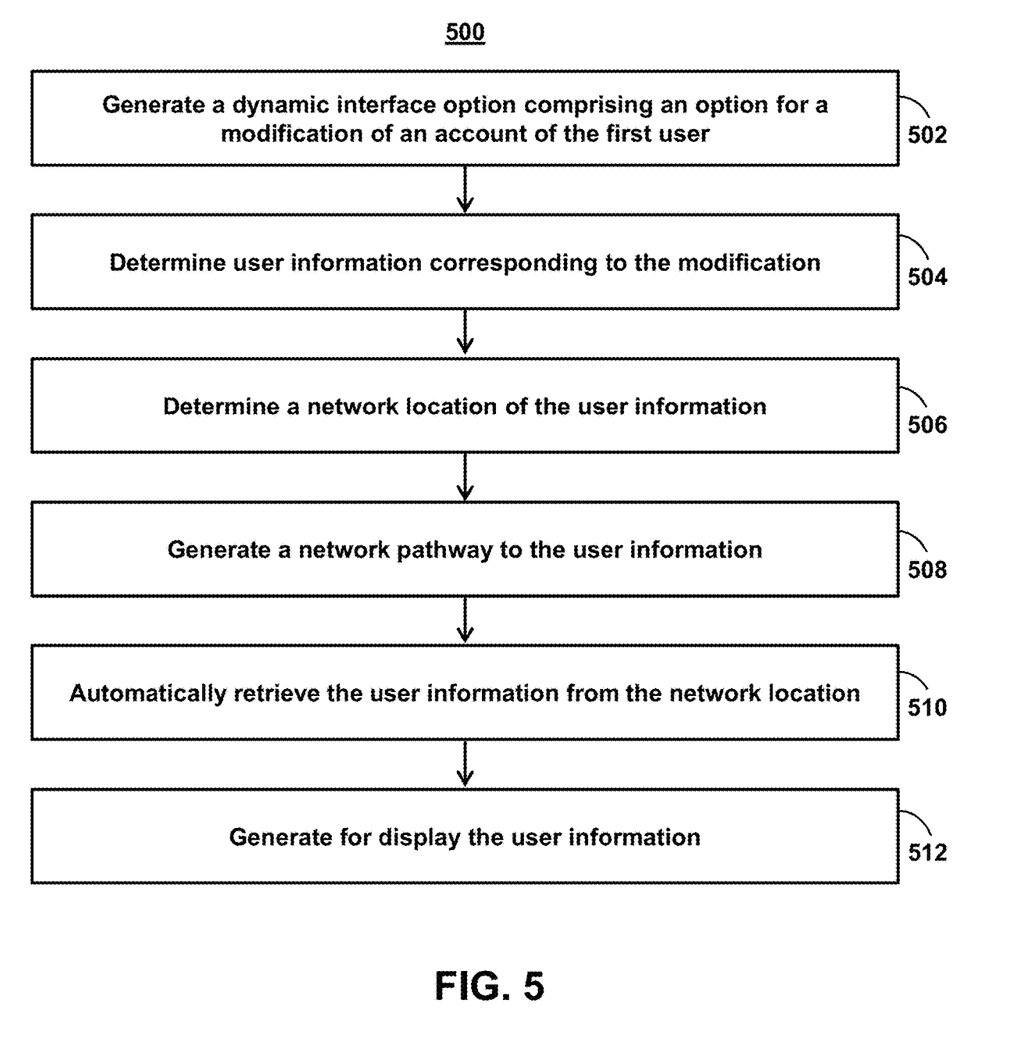
FIG. 5 shows a flowchart of the steps involved in generating user information for dynamic interface options, in accordance with one or more embodiments.

FIG. 5 shows a flowchart of the steps involved in generating user information for dynamic interface options, in accordance with one or more embodiments. For example, process 500 may represent the steps taken by one or more devices, as shown in FIGS. 1-3, when generating user information. For example, the dynamic interface option may comprise an option to pay a bill. In order to facilitate this action, the system may retrieve information about the user (e.g., login credentials) or information relevant to paying the bill (e.g., an amount due, a due date, a payment format, stored user credit card and account information). In another example, in some embodiments, a user may end a device interface session with an application that generates dynamic interface options (e.g., a mobile application). The user may then contact (e.g., via the same or a different platform) another user. The other user may (e.g., be a service representative associated with a provider of the application). In order to improve the device interface session between the first and second user, the system may provide recommendation to the second user about potential questions that the first user may have. Additionally or alternatively, the system may location information in the system of the second user, determine a network pathway to quickly and efficiently retrieve this information, and/or pre-fetch this information. In each case, the system may more efficiently (and in less time) obtain relevant information that may inform the second user about potential questions of the first user. Thus, the device interface session between the first and second user may be improved.

At step 502, process 500 (e.g., using one or more components in system 300 (FIG. 3)) generates a dynamic interface option comprising an option for a modification of an account of the first user. For example, the system may generate an option for a modification of an account of the first user. This modification may comprise paying a bill, changing user account information, etc.

At step 504, process 500 (e.g., using one or more components in system 300 (FIG. 3)) determines user information corresponding to the modification. For example, the system may request information associated with the modification that indicates what information is needed.

At step 506, process 500 (e.g., using one or more components in system 300 (FIG. 3)) determines a network location of the user information. For example, the system may determine a network location of the user information for facilitating a modification of the account of the first user. For example, a network location may include a profile that includes a collection of network and sharing settings that are applied to the network. Based on the network location assigned to the user's active network connection, features such as file and printer sharing, network discovery, and other features may be enabled or disabled. These network locations are useful to allow users and computers and devices to networks and information stored on the networks.

At step 508, process 500 (e.g., using one or more components in system 300 (FIG. 3)) generates a network pathway to the user information. For example, the system may generate a network pathway to the user information. For example, the pathway may include a path for traffic and/or requests/responses in a network or between or across multiple networks.

At step 510, process 500 (e.g., using one or more components in system 300 (FIG. 3)) automatically retrieves the user information from the network location. For example, the system may automatically retrieve the user information from the network location in response to the other user action.

At step 512, process 500 (e.g., using one or more components in system 300 (FIG. 3)) generates for display the user information. For example, the system may generate for display the user information during the device interface session. In another example, the system may generate for display the user information on a second user interface (e.g., an interface on the same device during the same device session or a different device). In some embodiments, the second user interface may be located remotely from the first user interface.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic interface options using machine learning models featuring multi-modal feature inputs, the method comprising: receiving, using control circuitry, a first user action, from a first user, during a device interface session with a user interface; determining, using the control circuitry, a first user interface image corresponding to the first user action in the user interface; determining, using the control circuitry, metadata related to the first user interface image; retrieving, using the control circuitry, time-dependent user account information for the first user during the device interface session with the user interface; generating, using the control circuitry, a first feature input based on the metadata; generating, using the control circuitry, a second feature input based on the time-dependent user account information; inputting, using the control circuitry, the first feature input into a first machine learning model; inputting, using the control circuitry, the second feature input into a second machine learning model; and generating, at the user interface, a dynamic interface option selected by a machine learning model during the device interface session.
2. The method of embodiment 2, wherein the first machine learning model comprises a convolutional neural network, and wherein the second machine learning model performs a Weight of Evidence (WOE) analysis.
3. The method of any one of embodiments 1-2, wherein determining the metadata related to the first user interface image comprises: identifying text in the first image; parsing the text in the first image; and identifying keywords in the text.
4. The method of any one of embodiments 1-3, wherein determining the metadata related to the first user interface image comprises generating a pixel array based on the first user interface image.
5. The method of any one of embodiments 1-4, wherein the first machine learning model is a uses a Bidirectional Encoder Representations from Transformers (BERT) language model for performing natural language processing.
6. The method of any one of embodiments 1-5, wherein the time-dependent user account information comprises information on a frequency of an account update, information on an account status, or information on an account value.
7. The method of any one of embodiments 1-6, further comprising: determining a second user interface image corresponding to a second user action in the user interface during a previous device interface session; determining additional metadata related to the second user interface image; and updating the first feature input based on the additional metadata.
8. The method of any one of embodiments 1-5, wherein the dynamic interface option comprises an option for a modification of an account of the first user.
9. The method of embodiment 8, further comprising: determining a network location of user information for facilitating a modification of the account of the first user; and generating a network pathway to the user information.
10. The method of embodiment 9, further comprising: automatically retrieving the user information from the network location; and generating for display the user information during the device interface session.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

We claim:

1. A system for generating dynamic interface options using machine learning models featuring multi-modal feature inputs, the system comprising:
    storage circuitry configured to store:
        a first machine learning model, wherein the first machine learning model comprises a convolutional neural network; and
        a second machine learning model, wherein the second machine learning model performs a Weight of Evidence (WOE) analysis; and
    control circuitry configured to:
        receive a first user action, from a first user, during a device interface session with a user interface;
        determine a first user interface image corresponding to the first user action in the user interface;
        determine metadata related to the first user interface image;
        retrieve time-dependent user account information for the first user during the device interface session with the user interface;
        generate a first feature input based on the metadata;
        generate a second feature input based on the time-dependent user account information; and
        input the first feature input into the first machine learning model;
        input the second feature input into the second machine learning model; and input/output circuitry configured to:
generate, at the user interface, a dynamic interface option selected by a third machine learning model using an ensemble prediction of outputs from the first machine learning model and the second machine learning model, wherein the dynamic interface option comprises an option to modify an account of the first user.

2. A method for generating dynamic interface options using machine learning models featuring multi-modal feature inputs, the method comprising:
receiving, using control circuitry, a first user action, from a first user, during a device interface session with a user interface;
determining, using the control circuitry, a first user interface image corresponding to the first user action in the user interface;
determining, using the control circuitry, metadata related to the first user interface image;
retrieving, using the control circuitry, time-dependent user account information for the first user during the device interface session with the user interface;
generating, using the control circuitry, a first feature input based on the metadata;
generating, using the control circuitry, a second feature input based on the time-dependent user account information;
inputting, using the control circuitry, the first feature input into a first machine learning model;
inputting, using the control circuitry, the second feature input into a second machine learning model; and
generating, at the user interface, a dynamic interface option selected by a third machine learning model during the device interface session, wherein the third machine learning model uses ensemble prediction on outputs from the first machine learning model and the second machine learning model.

3. The method of claim 2, wherein the first machine learning model comprises a convolutional neural network, and wherein the second machine learning model performs a Weight of Evidence (WOE) analysis.

4. The method of claim 2, wherein determining the metadata related to the first user interface image comprises:
identifying text in the first user interface image;
parsing the text in the first user interface image; and
identifying keywords in the text.

5. The method of claim 2, wherein determining the metadata related to the first user interface image comprises generating a pixel array based on the first user interface image.

6. The method of claim 2, wherein the first machine learning model uses a Bidirectional Encoder Representations from Transformers (BERT) language model for performing natural language processing.

7. The method of claim 2, wherein the time-dependent user account information comprises information on a frequency of an account update, information on an account status, or information on an account value.

8. The method of claim 2, further comprising:
determining a second user interface image corresponding to a second user action in the user interface during a previous device interface session;
determining additional metadata related to the second user interface image; and
updating the first feature input based on the additional metadata.

9. The method of claim 2, wherein the dynamic interface option comprises an option for a modification of an account of the first user.

10. The method of claim 9, further comprising:
determining a network location of user information for facilitating a modification of the account of the first user; and
generating a network pathway to the user information.

11. The method of claim 10, further comprising:
automatically retrieving the user information from the network location; and
generating for display the user information during the device interface session.

12. A non-transitory, computer-readable medium for generating dynamic interface options using machine learning models featuring multi-modal feature inputs, comprising instructions that, when executed by one or more processors, cause operations comprising:
receiving a first user action, from a first user, during a device interface session with a user interface;
determining a first user interface image corresponding to the first user action in the user interface;
determining metadata related to the first user interface image;
retrieving time-dependent user account information for the first user during the device interface session with the user interface;
generating a first feature input based on the metadata;
generating a second feature input based on the time-dependent user account information;
inputting the first feature input into a first machine learning model;
inputting the second feature input into a second machine learning model; and
generating, at the user interface, a dynamic interface option selected by a third machine learning model during the device interface session, wherein the third machine leaning model uses ensemble prediction on outputs from the first machine learning model and the second machine learning model.

13. The non-transitory, computer-readable medium of claim 12, wherein the first machine learning model comprises a convolutional neural network, and wherein the second machine learning model performs a Weight of Evidence (WOE) analysis.

14. The non-transitory, computer-readable medium of claim 12, wherein determining the metadata related to the first user interface image comprises:
identifying text in the first user interface image;
parsing the text in the first user interface image; and
identifying keywords in the text.

15. The non-transitory, computer-readable medium of claim 12, wherein determining the metadata related to the first user interface image comprises generating a pixel array based on the first user interface image.

16. The non-transitory, computer-readable medium of claim 12, wherein the first machine learning model is a uses a Bidirectional Encoder Representations from Transformers (BERT) language model for performing natural language processing.

17. The non-transitory, computer-readable medium of claim 12, wherein the time-dependent user account information comprises information on a frequency of an account update, information on an account status, or information on an account value.

18. The non-transitory, computer-readable medium of claim 12, further comprising instructions that cause further operations comprising:
- determining a second user interface image corresponding to a second user action in the user interface during a previous device interface session;
- determining additional metadata related to the second user interface image; and
- updating the first feature input based on the additional metadata.

19. The non-transitory, computer-readable medium of claim 12, wherein the dynamic interface option comprises an option for a modification of an account of the first user.

20. The non-transitory, computer-readable medium of claim 19, further comprising instructions that cause further operations comprising:
- determining a network location of user information for facilitating a modification of the account of the first user;
- generating a network pathway to the user information;
- automatically retrieving the user information from the network location; and
- generating for display the user information during the device interface session.

* * * * *